United States Patent
Constans

(10) Patent No.: US 8,657,080 B2
(45) Date of Patent: Feb. 25, 2014

(54) ANNULAR DISK BRAKE AND METHOD OF INCREASING A BRAKE PAD CLAMPING FORCE

(75) Inventor: Alain Constans, Terrebonne (CA)

(73) Assignee: Asteria Performance Inc., Montreal, Quebec (CA)

( * ) Notice: Subject to any disclaimer, the term of this patent is extended or adjusted under 35 U.S.C. 154(b) by 200 days.

(21) Appl. No.: 12/742,541

(22) PCT Filed: Nov. 27, 2008

(86) PCT No.: PCT/CA2008/002077
§ 371 (c)(1),
(2), (4) Date: May 12, 2010

(87) PCT Pub. No.: WO2009/067801
PCT Pub. Date: Jun. 4, 2009

(65) Prior Publication Data
US 2010/0258387 A1   Oct. 14, 2010

Related U.S. Application Data

(60) Provisional application No. 60/990,324, filed on Nov. 27, 2007.

(51) Int. Cl.
*F16D 55/14* (2006.01)
*F16D 55/08* (2006.01)

(52) U.S. Cl.
USPC .................. 188/72.2; 188/72.7; 188/218 XL

(58) Field of Classification Search
USPC ............. 188/72.2, 72.7, 73.1, 218 R, 218 XL
See application file for complete search history.

(56) References Cited

U.S. PATENT DOCUMENTS

| 3,633,714 | A | 1/1972 | Klaue |
| 3,802,539 | A * | 4/1974 | Thiele .......................... 188/72.9 |
| 5,651,437 | A | 7/1997 | Organek et al. |
| 6,318,513 | B1 | 11/2001 | Dietrich et al. .............. 188/72.7 |
| 6,374,963 | B1 | 4/2002 | Xie |
| 7,735,613 | B2 * | 6/2010 | Baumann et al. ............. 188/72.7 |
| 2003/0205438 | A1 | 11/2003 | Hartsock ....................... 188/342 |
| 2005/0139436 | A1 | 6/2005 | Baumann et al. |
| 2009/0218181 | A1 * | 9/2009 | Koyama et al. .............. 188/72.7 |

FOREIGN PATENT DOCUMENTS

| DE | 10 2004 008 383 A1 | 9/2005 |
| EP | 0953785 A2 | 11/1999 |
| WO | 2005038287 A1 | 4/2005 |
| WO | 2006047886 A1 | 5/2006 |

OTHER PUBLICATIONS

Supplementary European Search Report, Application No. EP 08 85 3693, Mar. 15, 2011.
International Search Report for International Application No. PCT/CA2008/002077.

* cited by examiner

*Primary Examiner* — Melody Burch
(74) *Attorney, Agent, or Firm* — Heslin Rothenberg Farley & Mesiti P.C.

(57) ABSTRACT

The annular disk brake comprises a rotor disk and at least one brake pad provided on each side of the rotor disk. The brake pad or pads on one side are connected to a substantially axially-guided brake pad carrier. The brake has a force transmitting arrangement creating a force increasing amplification between an axially-actuated member and the carrier. This arrangement can increase the brake compactness and provide an even distribution of the braking force around the circumference of the rotor disk. A method of increasing a brake pad clamping force is also disclosed.

17 Claims, 11 Drawing Sheets

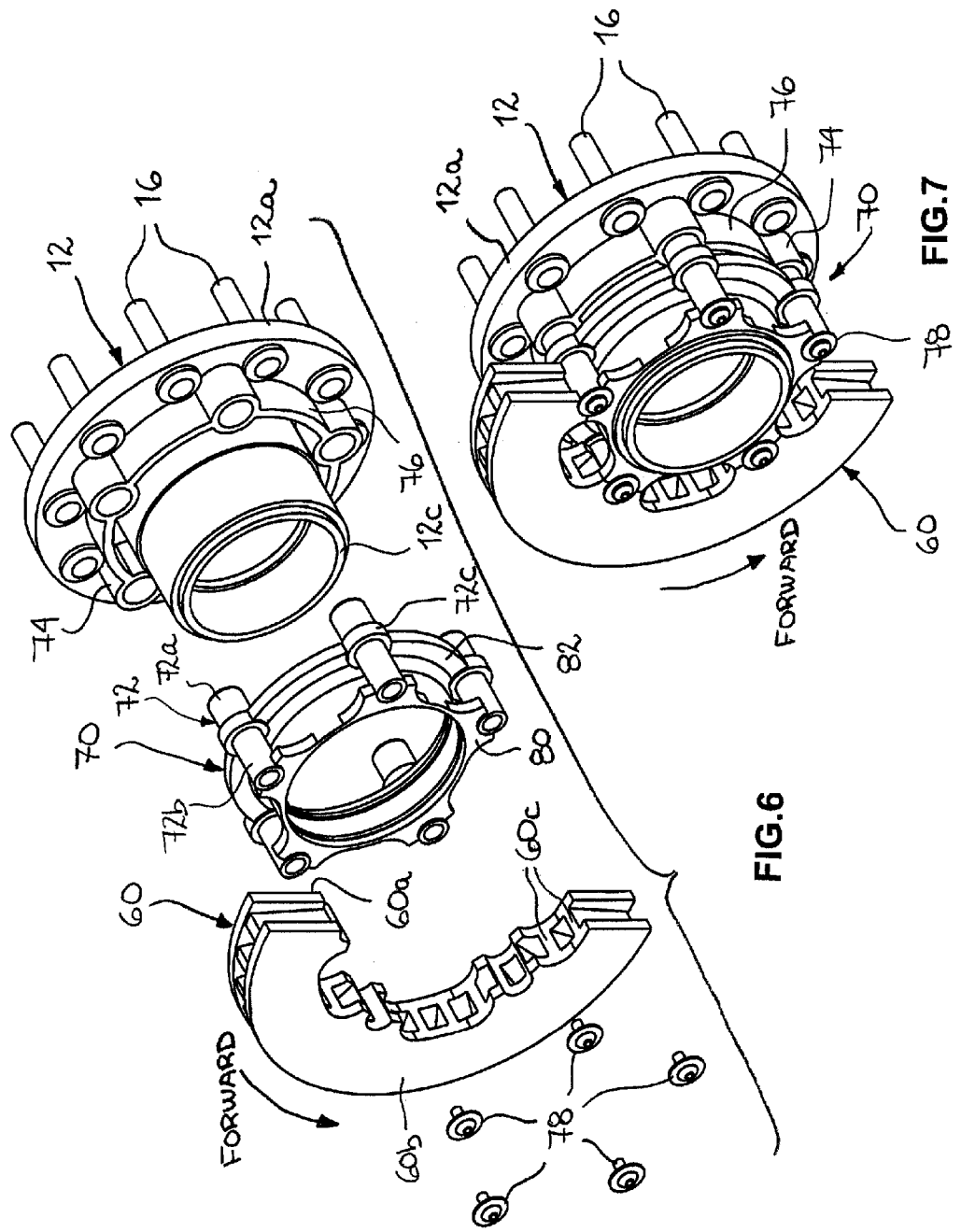

ANNULAR DISK BRAKE AND METHOD OF INCREASING A BRAKE PAD CLAMPING FORCE

CROSS-REFERENCE TO RELATED APPLICATIONS

This application is a national stage filing under Section 371 of International Application No. PCT/CA2008/002077, filed on Nov. 27, 2008, and published under the PCT Articles in English as WO 2009/067801 on Jun. 4, 2009. PCT/CA2008/002077 claimed priority to U.S. Provisional Patent Application Ser. No. 60/990,324, filed on Nov. 27, 2007. The entire disclosures of PCT/CA2008/002077 and U.S. Provisional Patent Application Ser. No. 60/990,324 are incorporated herein by reference in their entirety.

TECHNICAL FIELD

The technical field relates to annular disk brakes and methods of increasing brake pad clamping forces in annular disk brakes.

BACKGROUND

Annular disk brakes are sometimes referred to in prior references as full-contact annular disk brakes. An annular disk brake comprises at least one rotor disk that is axially movable with reference to a fixed component. The rotor disk is in a torque-transmitting engagement with a rotating element, such as the wheel of a vehicle for instance. The rotor disk is axially positioned between one or more fixed braking pads on one side, and one or more axially movable braking pads on the opposite side of the rotor disk. The set of movable brake pads is axially pushed against the corresponding side of the rotor disk by mean of an actuator, for instance a pneumatic, hydraulic or electric actuator. A braking friction and heat are generated when the fixed and the movable brake pads are in a clamping engagement with the sides of the rotor disk.

There are numerous challenges in the design of annular disk brakes. One is to be able to generate a suitable clamping force using an actuator that can fit in the space available for the brake. Annular disk brakes are often provided in vehicles and these annular disk brakes are generally mounted within or very close to a respective wheel of a vehicle. The space available for each brake is thus relatively limited, even in the case of large vehicles. Moreover, vehicle manufacturers are constantly looking for brakes that are increasingly compact to reduce this space. The various requirements can be particularly complex to meet when designing annular disk brakes to be connected to a pneumatic system used as a main source of power for the brakes. Room for improvements always exists in the design of annular disk brakes.

SUMMARY

In one aspect, there is provided an annular disk brake having a central axis, the brake being characterized in that it comprises: a main support coaxially disposed with reference to the central axis; a rotor disk coaxially disposed with reference to the central axis and being in a sliding and torque-transmitting engagement with the main support, the rotor disk having opposite outboard and inboard sides; a casing inside which the main support is mounted for rotation around the central axis; at least one first brake pad having a surface facing the outboard side of the rotor disk, the at least one first brake pad being connected inside the casing; at least one second brake pad having a surface facing the inboard side of the rotor disk; a substantially axially-guided brake pad carrier coaxially disposed with reference to the central axis, the brake pad carrier having opposite outboard and inboard sides, the at least one second brake pad being positioned on the outboard side of the brake pad carrier; an actuator assembly connected to the casing, the actuator assembly comprising an axially-actuated member; and a force transmitting arrangement comprising a first cam interface between the axially-actuated member and an intermediary member located between the axially-actuated member and the inboard side of the brake pad carrier, the intermediary member being coaxially disposed with reference to the central axis and pivoting in a radial plane, the arrangement further comprising a second cam interface between the intermediary member and the inboard side of the brake pad carrier, the brake pad carrier axially moving when the intermediary member pivots, whereby the arrangement creates a force increasing amplification between the axially-actuated member and the inboard side of the brake pad carrier.

In another aspect, there is provided a method of increasing a brake pad clamping force in an annular disk brake including an actuator and a rotor disk having a rotation axis, the method comprising the simultaneous steps of: generating a first force with the actuator of the brake, the first force being in a direction that is parallel to the rotation axis of the rotor disk and moving an axially-actuated member; generating a torque using the first force, the torque having a center of rotation that is substantially coincident with the rotation axis of the rotor disk; generating a second force using the torque, the second force being in a direction that is substantially identical to the direction of the first force and being greater in magnitude than the first force; and using the second force for clamping brake pads on opposite sides of the rotor disk.

The various aspects of the improvements presented herein will be apparent upon reading the following detailed description made in conjunction with the appended drawings.

BRIEF DESCRIPTION OF THE FIGURES

FIG. 6 is an isometric view showing the main support, the rotor disk, the rotor disk support and the connectors of the rotor disk used in the brake of FIG. 1;

FIG. 7 is an isometric view showing the various components illustrated in FIG. 6 when assembled together;

DETAILED DESCRIPTION

Figure 1:
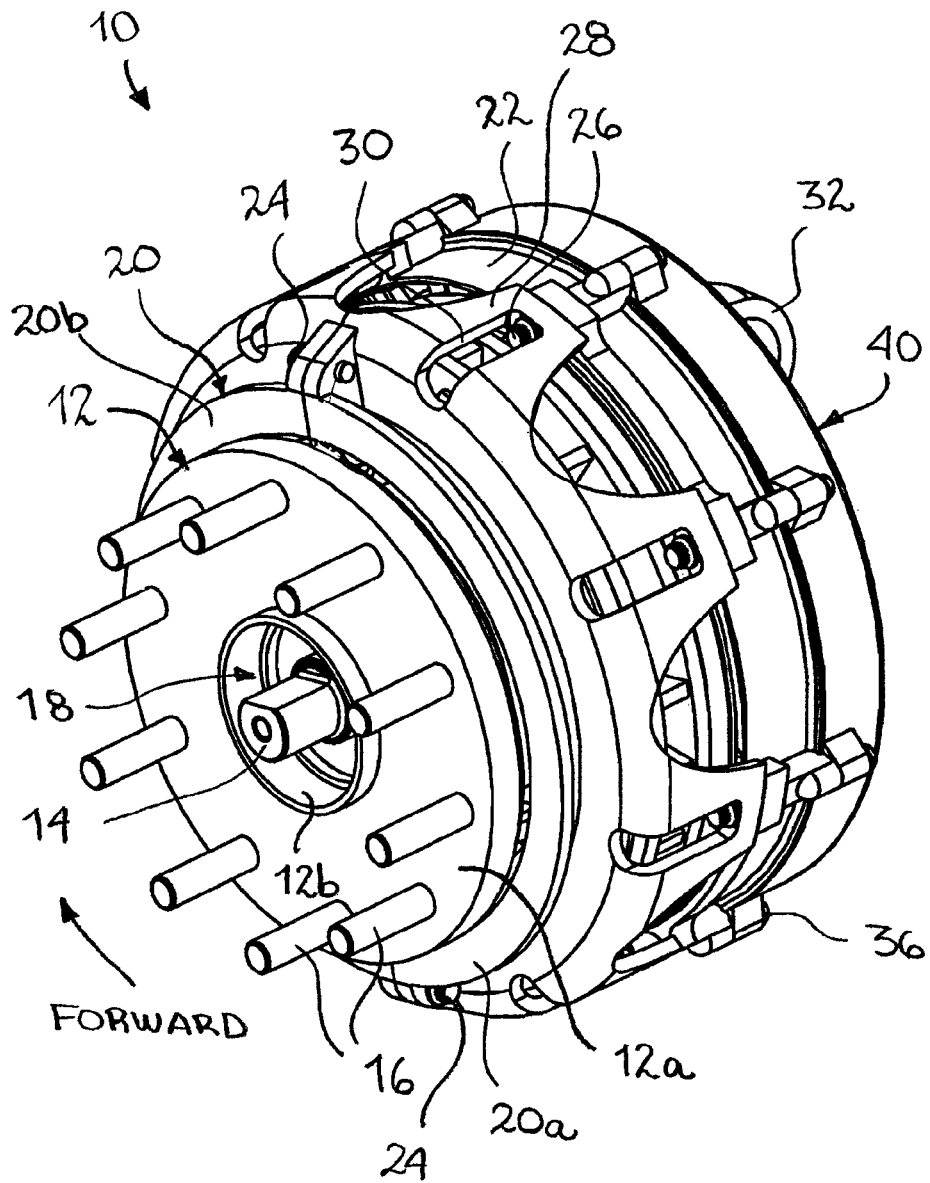
FIG. 1 is an isometric view showing the outboard side of an example of an annular disk brake with an example of the improved arrangement.
Figure 2:
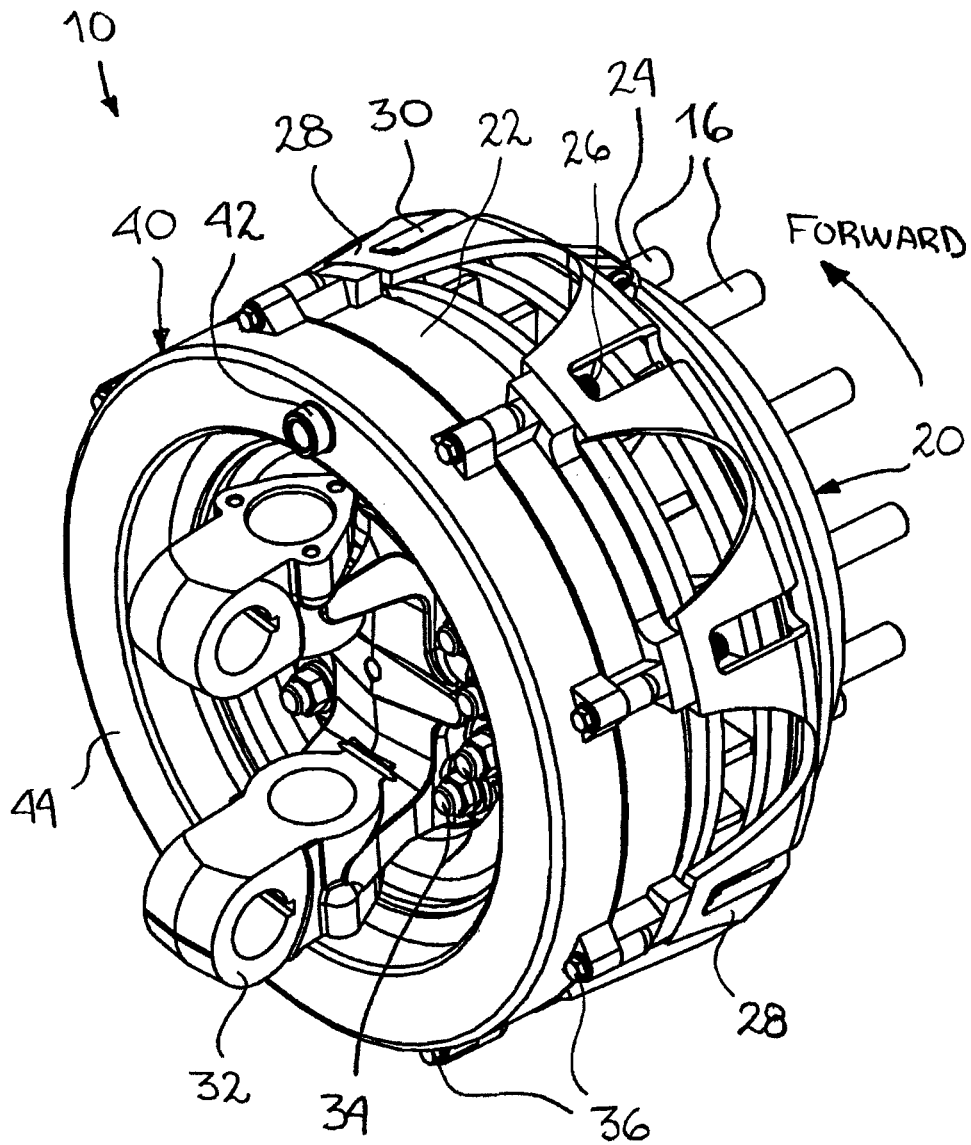
FIG. 2 is an isometric view showing the inboard side of the brake in FIG. 1.

FIGS. 1 to 2 show an example of an assembled annular disk brake 10 with an example of the improved arrangement. The illustrated brake 10 is designed to be used with the front right wheel (not shown) of a large vehicle, such as a truck or a bus. FIG. 1 is a view of the outboard side and FIG. 2 is a view of the inboard side of the brake 10. The words "outboard" and "inboard" in the present context refer to the relative position with reference to the longitudinal axis at the center of the vehicle. The wheel of the vehicle rotates in the clockwise rotational direction for an observer looking at the outboard side shown in FIG. 1 when the vehicle moves forward. An arrow with the label "FORWARD" is shown in FIG. 1 and in some of the other figures to indicate the rotational direction of the rotating components of the brake 10 when the vehicle moves forward. This corresponds to the main rotational direction of the brake 10.

It should be noted that a brake like the brake 10 that is to be used at the front left side of the vehicle would be a mirror image of what is shown. The brake 10 as illustrated can also be modified for use on many different kinds of vehicles, including vehicles that are not intended for road traveling, such as airplanes. Furthermore, using the brake 10 in a machine that is not a vehicle is possible as well. Such machine can have, for instance, a pulley or another rotating element to which the brake 10 is connected. The uses of the word "vehicle" or its equivalents in the present text only refer to the illustrated example and do not necessarily exclude using the brake 10 in other environments.

The illustrated brake 10 comprises a main support 12 to which the wheel of the vehicle is attached. The support 12 is journaled around an internal central spindle 14 coaxially located with reference to the central axis R of the brake 10 (see FIG. 3). The rotation axis of the wheel is coincident with the central axis R of the brake 10.

The support 12 has a plurality of axisymmetric mounting bolts 16 outwardly projecting from a radial portion 12a of the support 12. Ten mounting bolts 16 are shown in the illustrated example. Such configuration is common for large trucks. It should be noted that the threads of the mounting bolts 16 have not been illustrated.

The illustrated support 12 has a bearing cavity 18 therein. This bearing cavity 18 is shown open on the outboard side. The outboard opening of the bearing cavity 18 can be sealed off by a cap (not shown) that is attached on a circular flange 12b located around the outboard opening. The cap can be useful for preventing dirt or other contaminants from entering the bearing cavity 18 at the outboard side. Other arrangements are also possible.

Many of the components of the illustrated brake 10 are located within a casing. This casing comprises an outboard casing part 20 and an inboard casing part 22. In the illustrated example, the outboard casing part 20 is circumferentially divided in two halves 20a, 20b. These two halves 20a, 20b are secured together using two bolts 24. Also in the illustrated example, the spindle 14 is connected to the inboard casing part 22, as explained in more details later in the text, thereby forming an integral part therewith.

The outboard casing part 20 is connected to the inboard casing part 22 using a plurality of bolts 26. The outboard casing part 20 has a plurality of circumferentially-distributed flanges 28 extending axially toward the inboard casing part 22 and which provide anchoring points for the corresponding bolts 26. The flanges 28 of the outboard casing part 20 are spaced apart from each other and have a respective opening 30 therein. This open configuration promotes air circulation within the brake 10. Variants are possible as well.

The outboard casing part 20 and the inboard casing part 22 of the casing are parts that are not rotating with the support 12 when the vehicle is in movement. However, in the illustrated example, they are connected to the frame or body of the vehicle through a steering knuckle 32. The steering knuckle 32 is bolted on the rear side of the inboard casing part 22. FIG. 2 shows the steering knuckle 32 and some of the bolts 34 provided to connect the steering knuckle 32 to the inboard casing part 22. The steering knuckle 32 is used since the brake 10 of the illustrated example is for a front steering wheel. The whole brake 10 thus pivots with the wheel of the vehicle, for instance when a driver of the vehicle steers the wheel. Other arrangements are possible as well. For instance, if the brake 10 is used in a non-steerable environment, for instance a non-steerable wheel such as those provided at the rear of most vehicles, the outboard casing part 20 and inboard casing part 22 can be directly connected to a component such as a cross member or to a suspension arm. The inboard casing part 22 can then be directed connected to an axle. Other configuration can also be devised, depending on the requirements.

In the illustrated example, an actuator assembly 40 has a generally annular configuration and is connected outside the casing, more particularly to the rear side of the inboard casing part 22, using the bolts 36. The inboard casing part 22 is thus positioned between the outboard casing part 20 and the actuator assembly 40. The actuator assembly 40 can also be connected differently to the casing. As can be appreciated, mounting the actuator assembly 40 on the inboard side of the inboard casing part 22 can increase the compactness of the brake 10 compared to designs where an actuator assembly is provided inside the casing.

FIG. 2 further shows a pressurized fluid inlet 42 for the actuator assembly 40. In the case of a pneumatic actuator assembly, the inlet 42 can be a pneumatic connection receiving a pressurized gas, for instance pressurized air, by which the brake 10 is controlled. The force generated by the actuator assembly 40 is then controlled by the input pressure at the actuator assembly 40. It is also possible to actuate the brake 10 using pressurized liquids, for instance pressurized oil, or using an electric actuator. Still, in the case of a vehicle using a pneumatic actuator assembly, for instance a truck, the brake 10 can be designed with a fail safe mode so that when the inlet receives no pressure or otherwise receives an insufficient pressure, the brake 10 is automatically set to a full or nearly full braking position. Likewise, it is possible to provide valves or other elements to control the pressurized fluid directly inside the actuator assembly 40. The inlet would then only receive pressurized fluid at a relatively constant pressure and the actuation would be controlled within the brake 10 itself through a remote command. The remote command can be electric, mechanical or even using another pressurized fluid line (not shown) connected the brake 10 through another inlet (not shown).

Figure 3:
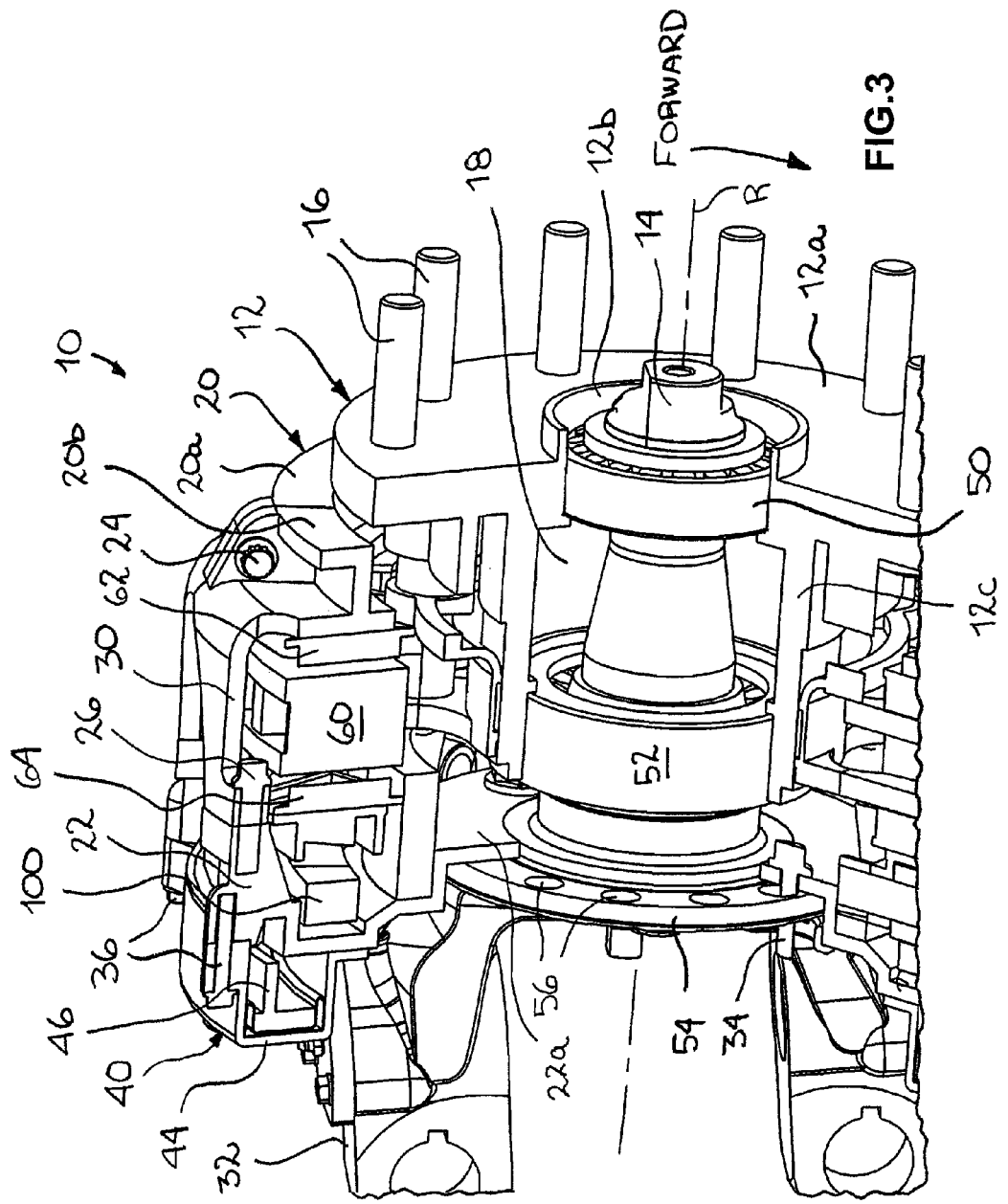
FIG. 3 is an enlarged isometric view, with a cutaway portion, of the brake in FIG. 1.

FIG. 3 is an enlarged view of the brake 10 shown in FIG. 1, the brake 10 being illustrated with a cutaway portion. This figure shows the support 12 and how the support 12 is mounted for rotation around the spindle 14 in the illustrated example. As can be seen, the support 12 includes a rearwardly-extending sleeve portion 12c connected to the radial portion 12a thereof. Two spaced-apart bearings 50, 52 are located within the bearing cavity 18 of the support 12. The inner races of the bearings 50, 52 are engaged on the spindle 14 while the outer races are engaged inside the radial portion 12a and the sleeve portion 12c of the support 12, respectively. The bearings 50, 52 are coaxial with the central axis R of the brake 10.

Also in FIG. 3, the spindle 14 is connected to a radially-disposed flange 54 that is itself connected or otherwise made integral with the other components of the inboard casing part 22. The illustrated flange 54 has a plurality of holes 56 through which the bolts 34 attaching the casing to the steering knuckle 32 are provided.

It should be noted at this point that the specific configuration of the bearings 50, 52 in the illustrated example is only one among a plurality of possible configurations. For instance, some configurations may require that the bearing cavity 18 be located on the outboard side with reference to the radial portion 12a of the support 12. The spindle of such configuration would be longer than the one illustrated. Many other configurations are possible as well.

FIG. 3 shows that the inboard casing part 22 of the illustrated brake 10 comprises an interior circular flange 22a having a plurality of holes that are in registry with the holes 56 of the flange 54 to which the spindle 14 is connected. Some of the other components that are shown in FIG. 3 are explained hereafter.

Figure 4:
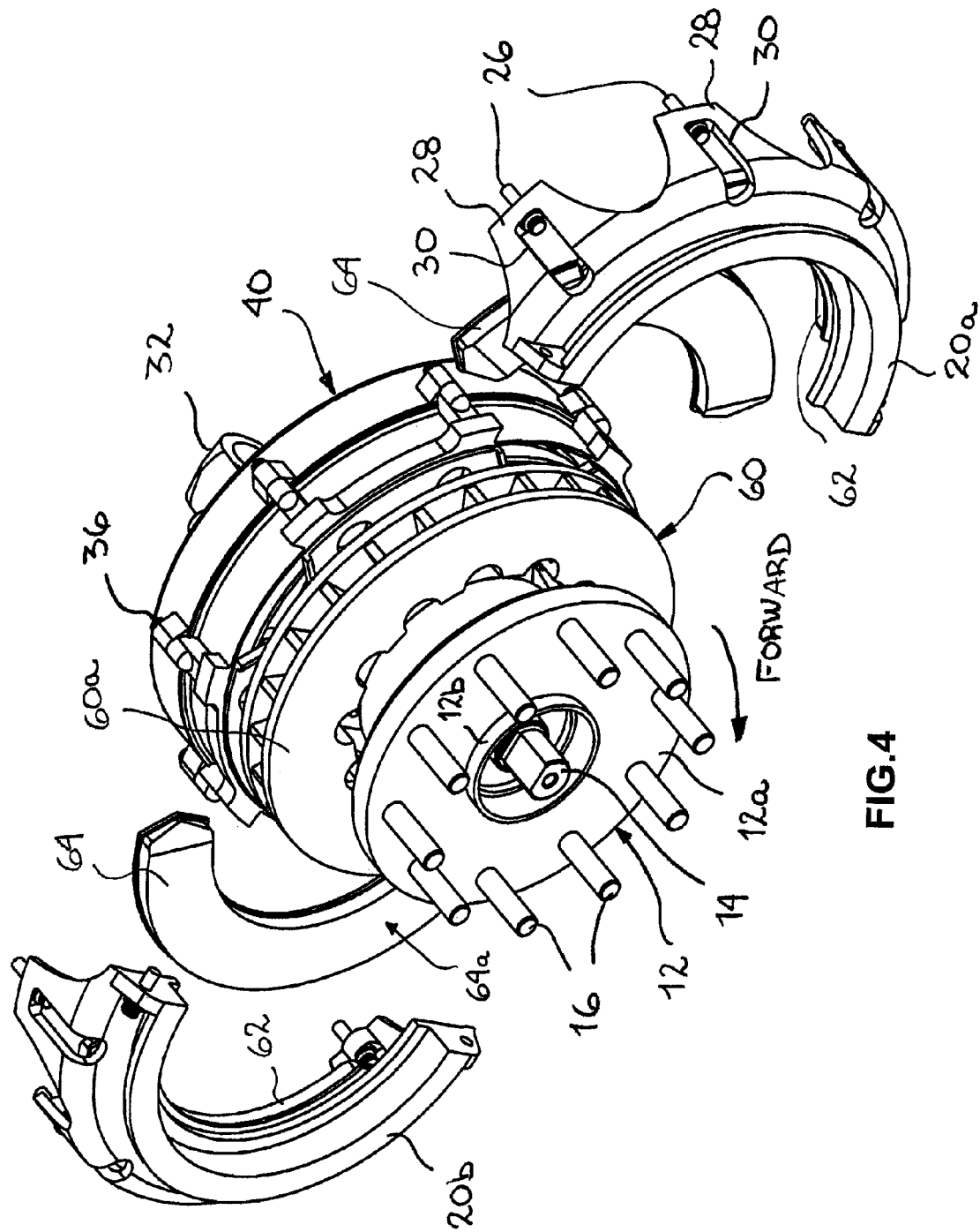
FIG. 4 is a view similar to FIG. 1, showing some of the components being detached from the rest of the brake.

FIG. 4 is an isometric view similar to FIG. 1. It shows the two halves 20a, 20b of the outboard casing part 20 being separated from each other, thereby exposing the rotor disk 60 of the brake 10. It should be noted, however, that the rotor disk 60 is illustrated in FIG. 4 without its support. This support will be explained later. The rotor disk 60 is coaxially located with reference to the central axis R (FIG. 3). Hence, the rotor disk 60 being a rotating part of the brake 10, the rotation axis of the rotor disk 60 is coincident with the central axis R of the brake 10.

Figure 5:
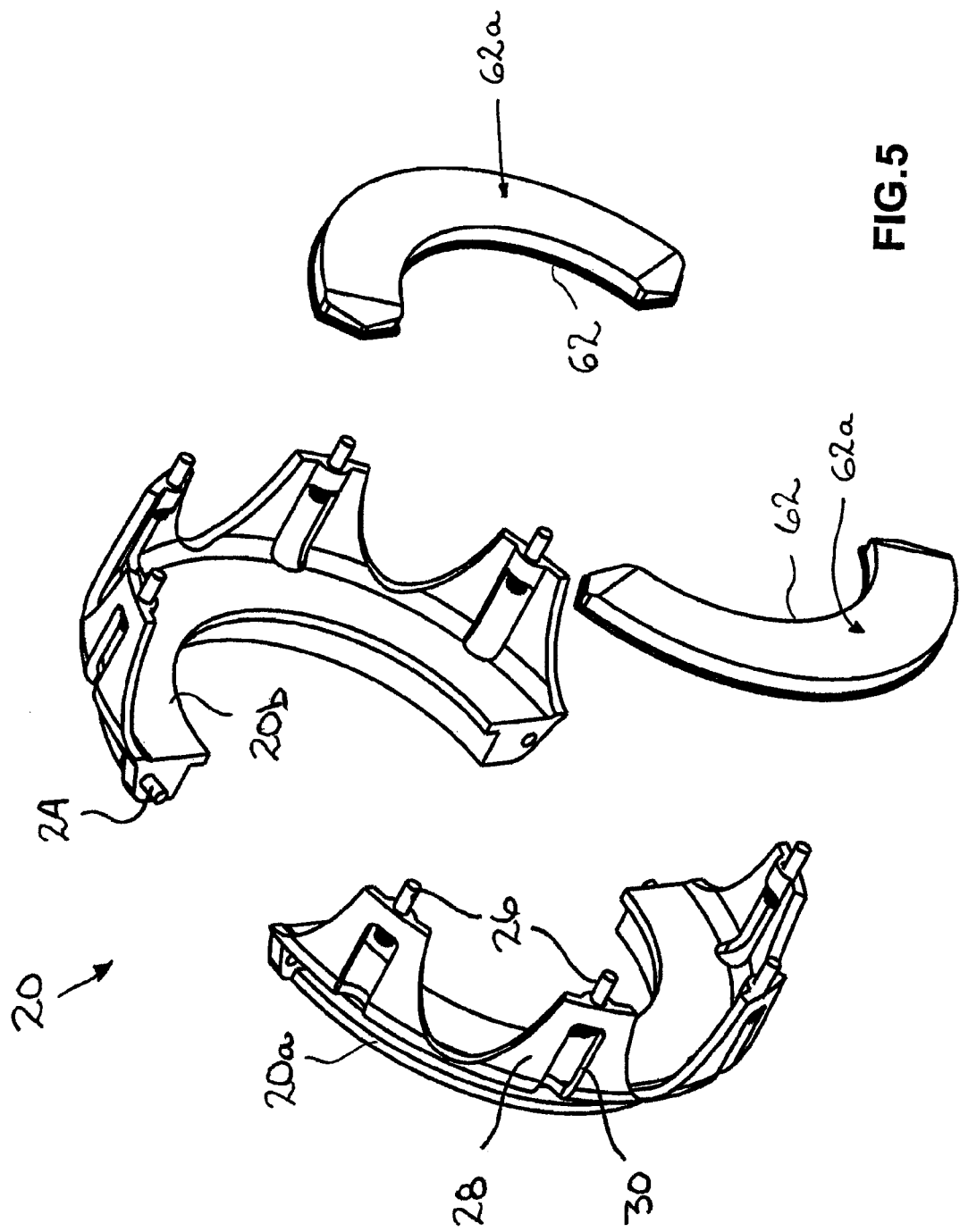
FIG. 5 is an isometric view showing the rear of the two halves of the outboard casing parts of the brake in FIG. 1 and their corresponding brake pads being separated.

FIG. 4 further shows that semicircular brake pads 62 are mounted at the back of the two halves 20a, 20b of the outboard casing part 20. These brake pads 62 are best shown in FIG. 5, which figure is an isometric exploded view showing the rear of the halves 20a, 20b and their respective brake pads 62. Each brake pad 62 is attached or is otherwise made integral with the halves 20a, 20b. Although there are two semicircular brake pads 62 in the illustrated example, one for each half 20a, 20b, it is possible to use a single circular brake pad (not shown) providing for instance a 360-degree contact with the rotor disk 60, or to use more than two semicircular brake pads. The outboard casing part 20 can also be made of a single block that is not separated in two halves.

The brake pads 62 can be connected inside the casing using screws or other removable fasteners but can also be permanently attached to the halves 20a, 20b. For instance, a metallic back side of the brake pads 62 can be welded or other permanently attached to a respective one of the halves 20a, 20b. This way, when the brake pads 62 are worn off, it would not be possible to detach the brake pads 62 from the halves 20a, 20b to replace them. Providing new sets of casing part halves 20a, 20b with integrated brake pads 62 simplifies the maintenance and the brake pads 62 will always be at the right position within the halves 20a, 20b.

In the illustrated example, the brake pads 62 connected to the halves 20a, 20b have a respective surface 62a that engages an outboard surface 60a of the rotor disk 60. An inboard surface 60b of the rotor disk 60 is engaged by another set of semicircular brake pads 64, which brake pads 64 are shown detached form the rest of the brake 10 in FIG. 4. The surfaces 60a, 60b of the rotor disk 60 can be machined so as to be as radial as possible and have the desired surface shape and treatment. As will be explained later, the second set of brake pads 64 is mounted on an axially-guided brake pad carrier 66.

When respective surfaces 64a of the inboard brake pads 64 engage the inboard surface 60b of the rotor disk 60, the rotor disk 60 is urged to move closer to the brake pads 62 located on the outboard side. Because they are connected to the outboard casing part 20, the brake pads 62 on the outboard side are fixed in position. Eventually, the rotor disk 60 is engaged by the brake pads 62, 64 on both sides. Increasing the force by which the brake pads 64 are engaged on the inboard surface 60b of the rotor disk 60 increases the brake pad clamping force, thus the friction with the braking pads 62, 64 on both sides of the rotor disk 60. The kinetic energy resulting from the motion of the vehicle or being supplied by the vehicle's engine is then transformed into heat in the brake 10 until a full stop of the vehicle or until the brake pad clamping force is released. Heat in the brake 10 eventually dissipates in the atmosphere.

FIG. 6 is an isometric exploded view showing the rotor disk 60 in a cross-section view and the rotor disk support 70 provided in the illustrated example to mount the rotor disk 60 to the support 12. As aforesaid, the rotor disk support 70 is not shown in FIG. 4. FIG. 7 shows the components of FIG. 6 after being assembled. It should be noted that in FIGS. 6 and 7, only one half of the rotor disk 60 is illustrated.

The rotor disk 60 of the illustrated example is made using two parallel annular walls forming the opposite outer surfaces 60a, 60b. The walls are connected together through a plurality of axisymmetric and radially extending ribs 60c forming air channels, as shown for instance in FIG. 6. The heated air tends to escape radially outwards while cooler air is admitted at a radially inner side of the rotor disk 60. The interior is shaped to fit over the rotor disk support 70. The various parts of the rotor disk 60 can be made integral with each other. Variants are possible as well.

As aforesaid, the rotor disk 60 is in a rotational engagement with the support 12 and the rotor disk support 70 allows the rotor disk 60 to move in the axial direction with reference to the support 12. This axial movement is of a magnitude which compensates the outboard pad wear. It should be also enough to move away from the brake pads 62 provided on the outboard casing part 20 when the braking force is released. Accordingly, when the brake 10 is inoperative, the rotor disk 60 should not overly engage the brake pads 62 so as to minimize friction.

The rotor disk support 70 of the illustrated example is a generally annular member that is coaxial with the central axis R of the brake 10 (FIG. 3). This rotor disk support 70 has a cylindrical interior provided with a low friction material and is engaged around the sleeve portion 12c of the support 12. The periphery of the rotor disk support 70 is provided with a plurality of axially extending pins 72 that are disposed axisymmetrically thereon. The pins 72 have an outboard side 72a fitting loosely in corresponding sleeves 74 integrally provided at the back of the radial portion 12a of the support 12. Five pins 72 and five sleeves 74 are provided in the illustrated example. However, using a different number is also possible and it is also possible to invert the relative position of the pins 72 and the sleeves 74.

As best shown in FIGS. 6 and 7, the sleeves 74 of the illustrated example are disposed between the heads of two mounting bolts 16. Two sleeves 74 are separated by the heads of two mounting bolts 16. An annular reinforcing wall 76 connects the sleeves 74 together. At least one among the pins 72 and the sleeves 74 is provided with a low friction material on their mating surface, either in the form of a coating or a bushing. This way, the relative axial movement between the rotor disk 60 and the support 12 can be relatively easy. Furthermore, the pins 72 of the illustrated example have a somewhat central portion 72c that have a larger diameter than that the sleeves 74. These central portions 72c act as stoppers.

As shown in FIG. 7, the rotor disk 60 is connected to its support 70 by mean of a plurality of screws or bolts 78 inserted into a threaded bore at the inboard end 72b of the pins 70. As shown, the pins 72 are connected to the rest of the rotor disk support 70 using radially-extending brackets 80, 82. FIG. 7 also shows that large openings can be provided between the rotor disk support 70 and the interior of the rotor disk 60 to promote air circulation. Variants are possible as well.

It should be noted that the outer diameter of the pins 72 is not necessary the same on the outboard side 72a than the inboard side 72b.

In use, when the wheel that is connected to the support 12 rotates and the brake 10 is activated, the clamping force applied on each side of the rotor disk 60 by the brake pads 62, 64 tends to slow down the rotation of the rotor disk 60, thereby creating a braking torque in the direction opposite the rotation of the wheel. This braking torque is transmitted from the rotor disk 60 to the wheel by the axially extending pins 72. Hence, these pins 72 receive substantially the entire braking torque generated by the brake 10.

There are many other ways that can be devised to create the rotational engagement between the support 12 and the rotor disk 60. Nevertheless, the illustrated rotor disk support 70 has good self-centering capability and can keep the rotor disk 60 within a radial plane at all times. The hysteresis of the brake 10 can also be very low.

Figure 8:
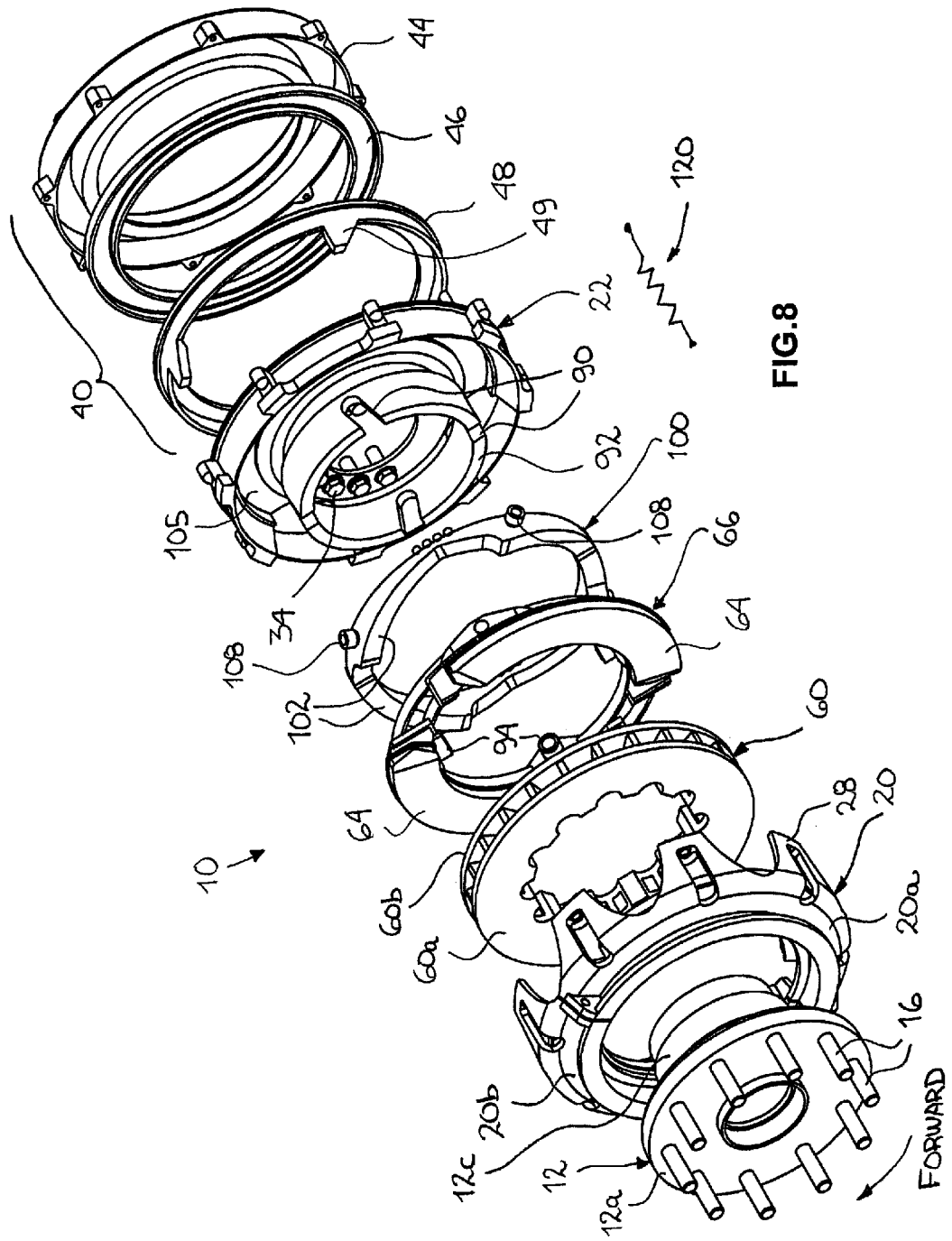
FIG. 8 is an exploded isometric view of the brake in FIG. 1.

FIG. 8 is an isometric exploded view of most of the components of the brake 10 shown in FIGS. 1 to 3. It should be noted, however that the interior of the illustrated rotor disk 60 is slightly different from what is shown in FIGS. 6 and 7. In FIG. 8, the components that are rotating together with the wheel are the support 12 and the rotor disk 60. Of course, the rotor disk support 70 (not shown in FIG. 8) also rotates together with the wheel. As aforesaid, the outboard casing part 20 and the inboard casing part 22 of the casing are not rotating with the support 12. They can be connected, in the illustrated example, to the steering knuckle 32, as shown in FIGS. 1 to 3, using the bolts 34. Only some of the bolts 34 are illustrated in FIG. 8. The actuator assembly 40 is connected at the back of the inboard casing part 22, as is explained later.

As aforesaid, the brake pads 64 are connected on one side of an axially-guided brake pad carrier 66. The brake pad carrier 66 of the illustrated example includes two concentric ring members 66a, 66b (FIG. 9) that are connected together using four axisymmetric roller support units 68. The brake pads 64 can be removably connected to the brake pad carrier 66. This removable connection simplifies maintenance since the brake pads 64 can then be replaced when worn off without removing the brake pad carrier 66 from the brake 10. Thus, as shown in FIG. 4, the brake 10 can be serviced on the inboard side by simply detaching the two brake pads 64 from the brake pad carrier 66. This can be done, for instance, by moving a locking mechanism or bolts (not shown).

Like for the brake pads 62 on the outboard side, it is possible to use a single circular brake pad instead of the two semicircular brake pads 64, or to use more than two semicircular brake pads 64. Also, in some configurations, the brake pads 64 could be made integral or be otherwise permanently fastened to the brake pad carrier 66.

The brake pad carrier 66 of the illustrated example is axially guided using a plurality of slots 90 provided in an inner sleeve 92 of the inboard casing part 22.

Figure 9:
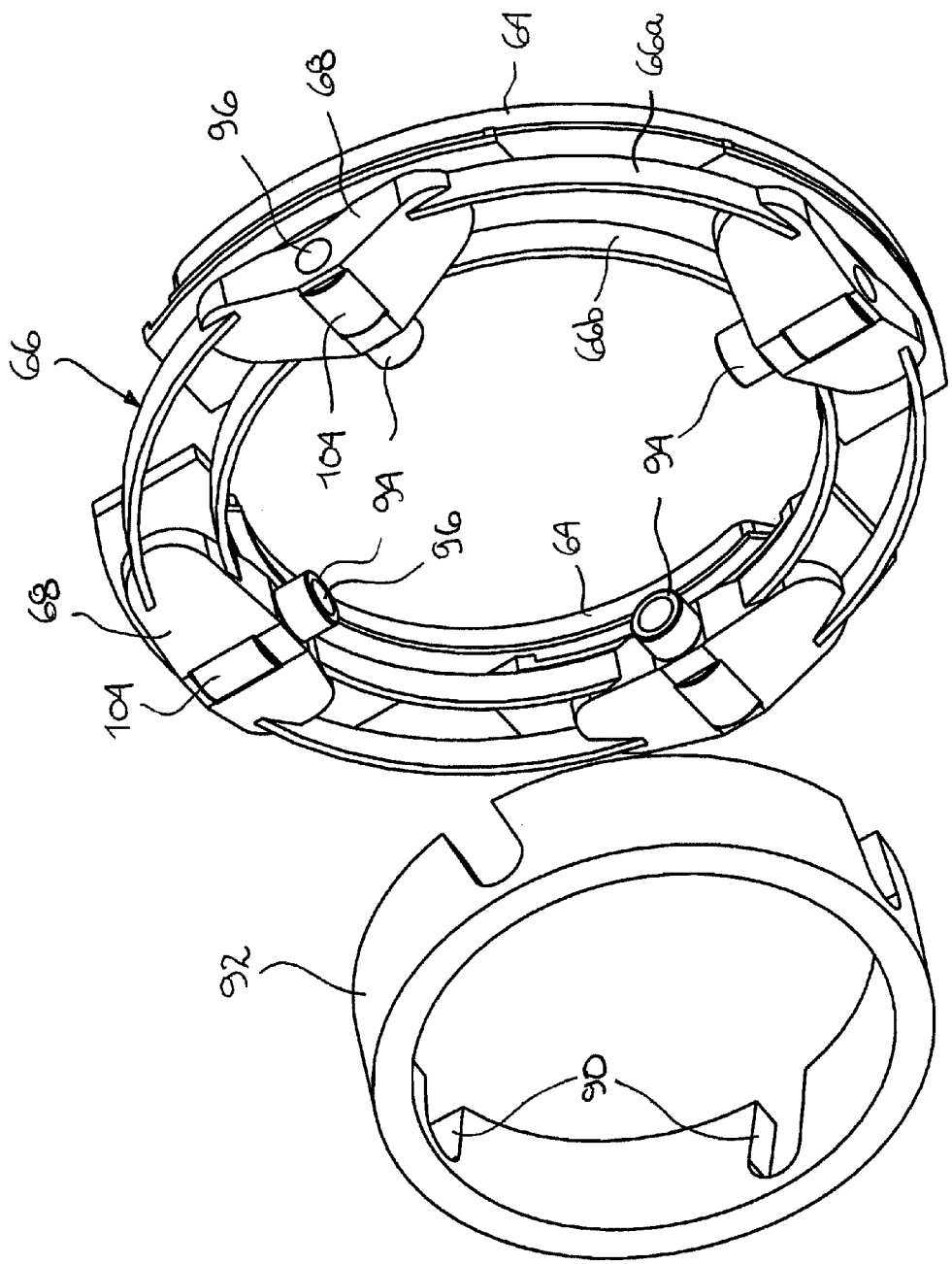
FIG. 9 is an isometric view of the rear of the brake pad carrier and the inner sleeve of the inboard casing part provided in the brake in FIG. 1.

The back of the brake pad carrier 66 and the inner sleeve 92 are illustrated in FIG. 9. It should be noted that the other components of the inboard casing part 22 have been omitted. The inner sleeve 92 can be made integral or otherwise connected to the other components of the inboard casing part 22 or directly journaled or permanently connected to the knuckle or spindle or axle beam.

There are two different sets of rollers on the brake pad carrier 66 of the illustrated example. The first set of rollers comprises rollers 94. Each roller 94 is mounted for rotation around a corresponding axle 96 that is radially extending with reference to the central axis R (FIG. 3). The rollers 94 project on the inner side of the brake pad carrier 66. They are loosely engaged in the slots 90 of the inner sleeve 92. The width of the slots 90 is slightly larger than the outer diameter of the rollers 94. The rollers 94 are then able to easily move along the slots 90.

It should be noted that the rollers 94 can be replaced by other kinds of followers, for instance sliding buttons, or any low friction sliding device, depending on the design.

Referring back to FIG. 8, the slots 90 of the illustrated example are slightly oblique with reference to a direction that is parallel to the central axis R (FIG. 3). The slots 90 are offset in the direction of the rotation of the wheel when the vehicle moves forward. As aforesaid, when the brake 10 is assembled, the rollers 94 on the inner side of the brake pad carrier 66 are engaged in the corresponding slots 90 of the inner sleeve 92. This provides the axial guidance of the brake pad carrier 66 when it moves closer or away from the rotor disk 60. The drag torque that can be generated on the brake pad carrier 66 when the brake 10 is activated is transmitted to the inboard casing part 22.

Because the slots 90 are inclined in FIG. 8 in the direction of rotation, the drag torque transmitted to the brake pad carrier 66 can generate an axial reaction force increasing the braking capacity. This additional braking force is therefore somewhat proportional to the intensity of the braking. The angle of the slots 90 can be adjusted in accordance with the specific needs and to prevent the braking force from being out of control. For instance, the average angle can be below 20°, such as between 10 and 20°. Other values are possible. Still, the slots 90 can also be curved to change the additional braking force when the brake pad carrier 66 moves closer or away with reference to the rotor disk 60. It is further possible to provide the slots 90 with non-parallel opposite walls. This may be useful to prevent the opposite effect if the vehicle brakes as it moves as in a reverse direction or if the vehicle is stopped in a steep hill in the upward direction.

Figure 10:
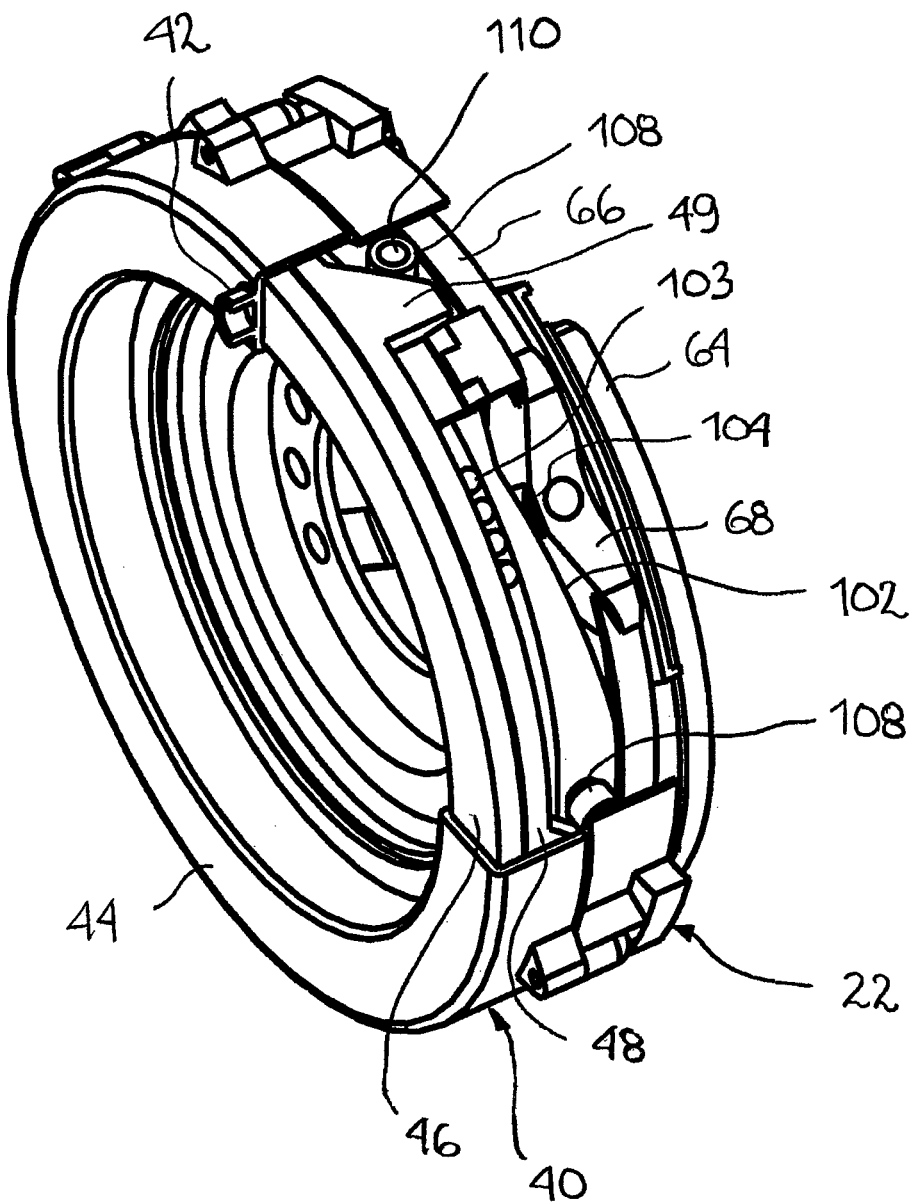
FIG. 10 is an isometric view showing some of the components at the rear of the brake in FIG. 1.
Figure 11:
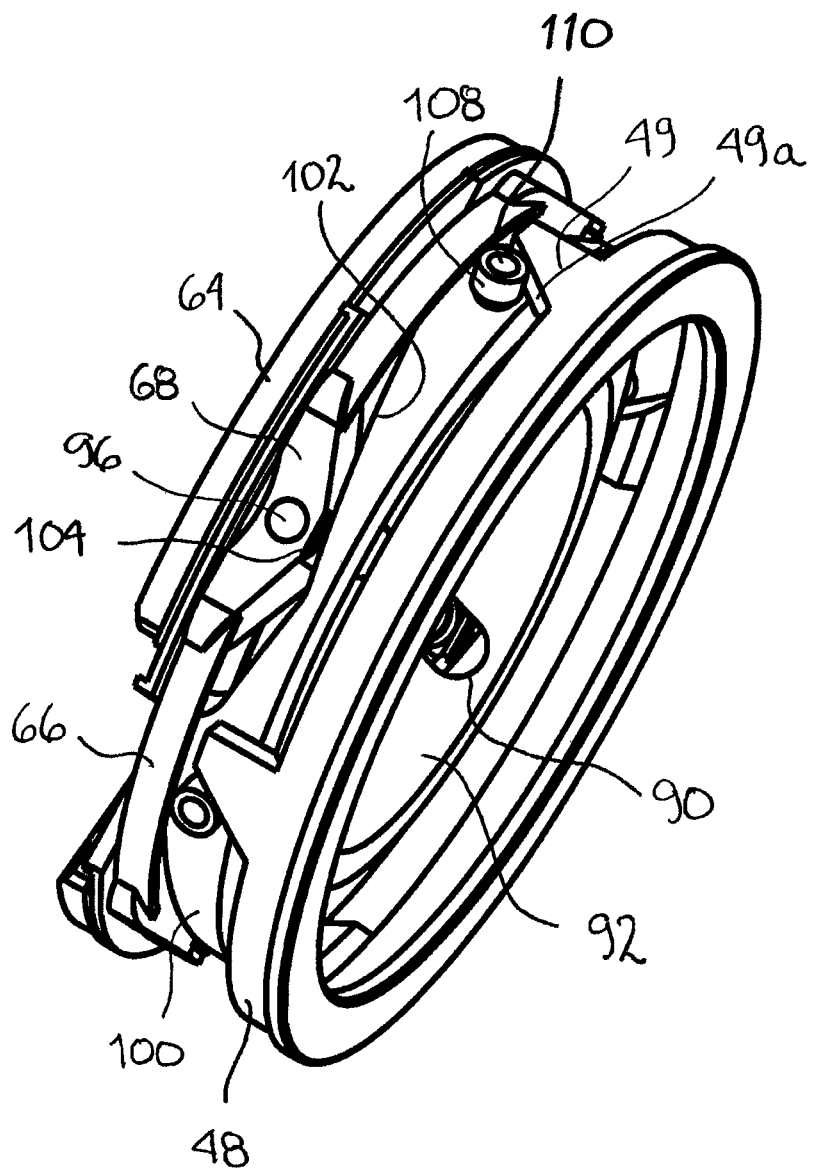
FIG. 11 is a view showing a subset of the components of FIG. 10 from another angle.
Figure 12:
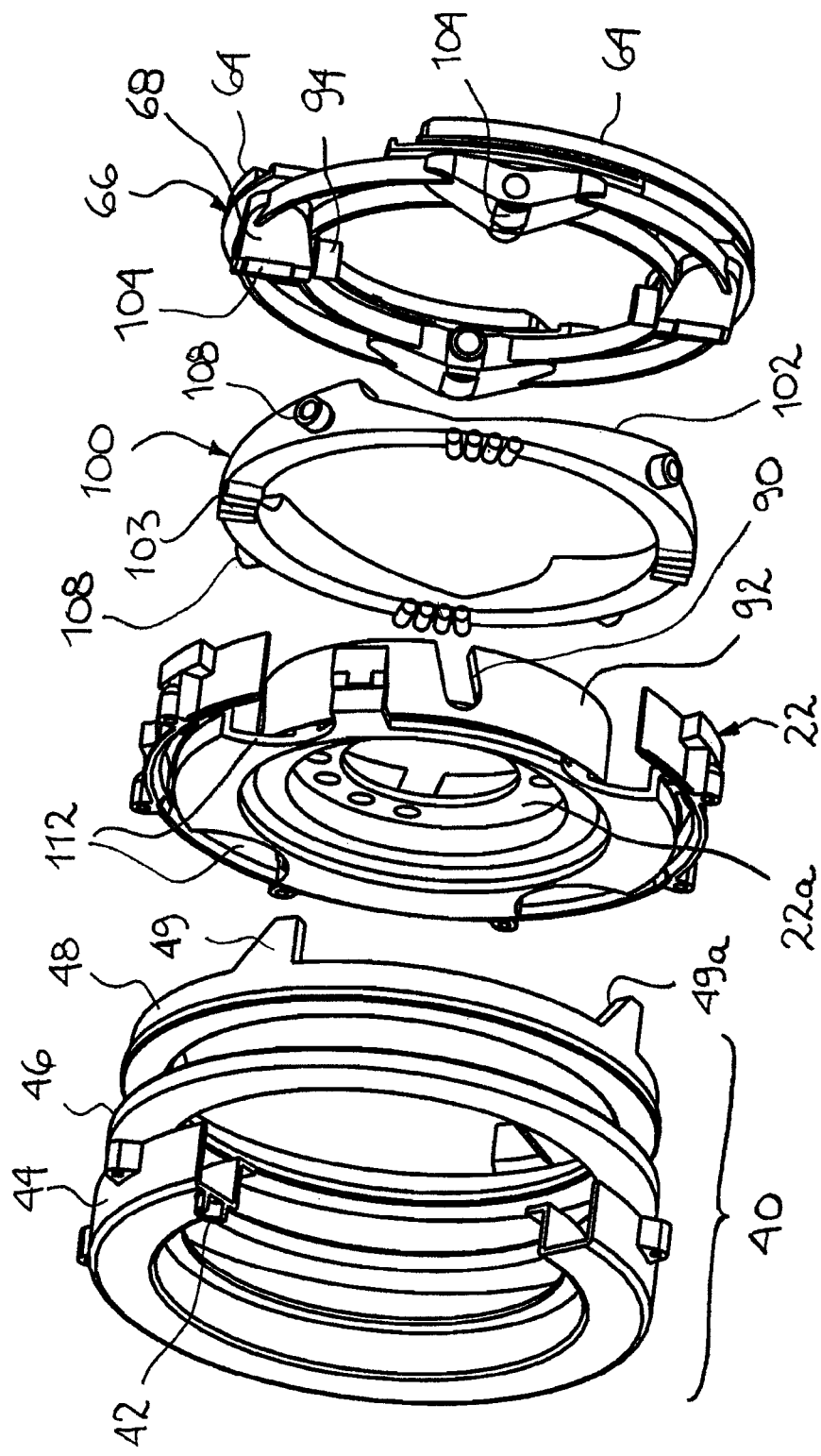
FIG. 12 is a view showing a subset of the components of FIG. 8 from another angle.

FIG. 8 also shows that an intermediary member 100 is located between brake pad carrier 66 and the inboard casing part 22 of the illustrated brake 10. The intermediary member 100 is also shown in FIGS. 10 to 12. The intermediary member 100 has axisymmetric and axially inclined ramp surfaces 102. The intermediary member 100 is coaxially disposed with reference to the central axis R (FIG. 3). It pivots in a radial plane within the inboard casing part 22 and around the inner sleeve 92 thereof. Bearings 103 or other low-friction elements are provided in the illustrated example between the rear surface of the intermediary member 100 and a surface 105 at the bottom of the inboard casing part 22 to facilitate the rotation of the intermediary member 100. The intermediary member 100 does not move in the axial direction.

The ramp surfaces 102 of the illustrated intermediary member 100 face the rear side of the brake pad carrier 66. These cam surfaces 102 are engaged by corresponding rollers 104 provided on the roller support units 68 of the brake pad carrier 66. The rollers 104 are shown for instance in FIG. 9. They can be mounted on the same axle 96 as the rollers 92. Other configurations are possible as well. It should be noted that the relative position of the ramp surfaces 102 and the rollers 104 can be inverted. Other variants are possible as well.

FIG. 10 is an isometric view showing the inboard casing part 22 and some of the components connected to it. FIG. 11 is a view similar to FIG. 10 and shows the same back side viewed from a different angle. FIG. 12 is an isometric view of all these parts. FIG. 11 does not show the casing 44 of the actuator assembly 40. FIGS. 10 and 12 show the casing 44 of the actuator assembly 40 and the inboard casing part 22 with a partial cutaway section.

Referring back to FIG. 8, the actuator assembly 40 of the illustrated example has an annular configuration. It comprises a pneumatically inflatable ring actuator 46 that is inserted in the casing 44 of the actuator assembly 40. The actuator assembly 40 also comprises an axially-actuated member 48 that is adjacent to the inflatable ring actuator 46. The axially-actuated member 48 is coaxially located with reference to the central axis R (FIG. 3). The diameter of the inflatable ring actuator 46 can then be larger compared to an inflatable ring that would be inserted within the inboard casing 22, for instance.

The axially-actuated member 48 comprises four axially projecting cams 49 with inclined cam surfaces 49a that are provided in an axisymmetric manner around the axially-actuated member 48. The cams 49 of the axially-actuated member 48 engage a corresponding follower, for instance a roller 108, provided at the periphery of the intermediary member 100. These rollers 108 have an axle 110 that is radially oriented with reference to the central axis R. As best shown in FIG. 12, arc-shaped openings 112 are provided at the periphery of the back wall of the illustrated inboard casing part 22 and the cams 49 of the axially-actuated member 48 are extending through a corresponding one of these openings 112 for engaging the outer rollers 108.

Because the cams 49 are in engagement with the rollers 108 of the intermediary member 100 and that the axially-actuated member 48 only moves in an axial direction, the intermediary member 100 is forced to pivot around the central axis R when the member 48 moves. The pivot movement moves the rollers 104 of the brake pad carrier 66 further up the ramp surfaces 102. This results in an axial movement of the brake pad carrier 66 towards the rotor disk 60. The global aim of actuator mechanism shown in FIGS. 10 to 12 is to reduce the inflatable ring axial displacement by a factor ratio to the brake pad carrier 66 and at the same time increase the brake pad carrier clamping force by an equivalent factor ratio from the inflatable ring actuator force. The therefore generated force amplification factor can be set around a value of 5 and be tuned by modifying the ratio of angle of the actuating ramps 49 and angle of the intermediate ramps 102. Furthermore, because of the specific configuration of the illustrated example, the axial movement of the brake pad carrier 66 generates a slight pivot movement of the brake pad carrier 66 in the same direction as the rotation of the wheel of the vehicle traveling in a forward direction.

A return spring arrangement is provided, for instance as part of the actuator assembly 40, for moving the brake pad carrier 66 away from the rotor disk 60 when the braking force decreases or is released. The return spring arrangement can include one or more springs. One spring is schematically illustrated in FIG. 8 at 120. The spring or springs 120 can be connected, for instance, between the brake pad carrier 66 and the inboard casing part 22. The spring or springs 120 can also be configured and disposed otherwise and many different configurations can be devised for moving the brake pad carrier 66 back to its original position.

In use, inflating the inflatable ring actuator of the actuator assembly 40 pushes the axially-actuated member 48 towards the outboard side. The configuration of the illustrated brake 10, however, creates a force increasing amplification between the axially-actuated member 48 and the brake pad carrier 66. This force amplification increases the braking force in the brake 10. The force transmitting arrangement of the illustrated brake 10 comprises the first cam interface that is provided between the axially-actuated member 48 and the intermediary member 100, and the second cam interface that is provided between the intermediary member 100 and the brake pad carrier 66. When the brake 10 is activated, such as when the driver of a vehicle depresses the brake pedal to slow down the moving vehicle, a first force is generated by the actuator 46 of the actuator assembly 40. The first force is in a direction that is parallel to the rotation axis of the rotor disk 60. A torque is simultaneously generated using the first force, the torque having a center of rotation that is substantially coincident with the rotation axis of the rotor disk 60. A second force is simultaneously generated using the torque, the second force being in a direction that is substantially identical to the direction of the first force and being greater in magnitude than the first force. The second force is used as the braking force for clamping the brake pads 62, 64 on opposite sides 60a, 60b of the rotor disk 60.

As can be appreciated, the design of a brake like the brake 10 can be made more compact than ever before. The brake 10 can also be configured to provide a stable self-increase of the braking capacity during the braking. Overall, many aspects of the design of the disk brake can thus be improved by mounting the axially movable set of brake pads on a guided brake pad carrier that is pushed against the rotor disk by an intermediary member, as shown. This arrangement can increase, for instance, the compactness of the brake. Furthermore, evenly distributing the braking force around the circumference of the rotor disk 60 improves the life span of the brake pads 62, 64.

If desired, a mechanism (not shown) can be provided to compensate the wear of the brake pads 62, 64 over time. Such system can moves, for instance, the lowest point on the intermediary member 100 to which the rollers 104 at the back of the brake pad carrier 66 can go when the braking force is released. Other configurations are also possible.

It should be noted that many modifications can be made to the brake 10 and the method presented herein. For instance, more than one rotor disk can be provided in an annular disk brake. In that case, the two rotor disks would be axially movable with reference to each other. Both rotor disks can be in rotational engagement with a main support of the brake. An additional brake pad carrier (not shown) can be provided between the two rotor disks. This intermediary brake pad carrier would be double-sided and freely movable in the axial direction but ideally, it can also be in rotational engagement with a fixed structure, such as the casings 20, 22 of the illustrated brake 10. If desired, the rotor disk can be a solid rotor without internal cooling channels like the ones of the illustrated example. Also, the opposite surfaces of the rotor disk, either with or without internal cooling channels, can be grooved or provided with holes to further improve cooling. If a pneumatic actuator is used, the pneumatic actuator can have a non-circular shape, for instance a square shape with rounded corners, so as to increase the surface area where needed and keep the actuator as compact as possible. As aforesaid, the actuator assembly that is shown and described can be replaced by another kind of actuator, which can involve hydraulic fluid or even an electric mechanism. Many other variants are also possible.

While several aspects of the present invention have been described and depicted herein, alternative aspects may be effected by those skilled in the art to accomplish the same objectives. Accordingly, it is intended by the appended claims to cover all such alternative aspects as fall within the true spirit and scope of the invention.

The invention claimed is:

1. An annular disk brake having a central axis, the brake comprising:
- a main support coaxially disposed with reference to the central axis;
- a rotor disk coaxially disposed with reference to the central axis and being in a sliding and torque-transmitting engagement with the main support, the rotor disk having opposite outboard and inboard sides;
- a casing inside which the main support is mounted for rotation around the central axis;
- at least one first brake pad having a surface facing the outboard side of the rotor disk, the at least one first brake pad being connected inside the casing;
- at least one second brake pad having a surface facing the inboard side of the rotor disk;
- a substantially axially-guided brake pad carrier coaxially disposed with reference to the central axis, the brake pad carrier having opposite outboard and inboard sides, the at least one second brake pad being positioned on the outboard side of the brake pad carrier;
- an actuator assembly connected to the casing, the actuator assembly comprising an axially-actuated member; and
- a force transmitting arrangement comprising a first cam interface between the axially-actuated member and an intermediary member located between the axially-actuated member and the inboard side of the brake pad carrier, the intermediary member being coaxially disposed with reference to the central axis and pivoting in a radial plane, the arrangement further comprising a second cam interface between the intermediary member and the inboard side of the brake pad carrier, the brake pad carrier axially moving when the intermediary member pivots, whereby the arrangement creates a force increasing amplification between the axially-actuated member and the inboard side of the brake pad carrier.

2. The annular disk brake as defined in claim 1, wherein the force increasing amplification has a ratio of between more than 1 and 5.

3. The annular disk brake as defined in claim 1, wherein the first cam interface comprises axisymmetric and axially-projecting cams having cam surfaces engaging respective followers, one among the cams and the followers being on the axially-actuated member and the other among the cams and the followers being on the intermediary member.

4. The annular disk brake as defined in claim 3, wherein the followers are rollers circumferentially-disposed around a periphery of the intermediary member or the axially-actuated member, the rollers being mounted for rotation around respective radially-disposed axles.

5. The annular disk brake as defined in claim 3, wherein the intermediary member is pivotally mounted within the casing.

6. The annular disk brake as defined in claim 1, wherein the second cam interface includes axisymmetric and axially inclined ramp surfaces engaged by respective followers, one among the ramp surfaces and the followers being on the inboard side of brake pad carrier and the other among the ramp surfaces and the followers being on the intermediary member.

7. The annular disk brake as defined in claim 6, wherein the intermediary member rotates in a rotational direction corresponding to a rotational direction of the support when the intermediary member moves the brake pad carrier closer to the rotor disk.

8. The annular disk brake as defined in claim 6, wherein the followers engaging the ramp surfaces are rollers.

9. The annular disk brake as defined in claim 1, wherein the brake pad carrier is axially-guided using a plurality of slots provided in a sleeve connected inside the casing, the sleeve being coaxially disposed with reference to the central axis, the slots being engaged by respective followers connected to the brake pad carrier.

10. The annular disk brake as defined in claim 9, wherein the slots are angularly-disposed with reference to a direction that is parallel to the central axis, the slots inducing a pivot movement of the brake pad carrier in a same rotational direction as that of the rotor disk when the brake pad carrier moves towards the rotor disk.

11. The brake annular disk as defined in claim 10, wherein the slots have an average angle between 10 and 20° with reference to the direction that is parallel to the central axis.

12. The annular disk brake as defined in claim 1, wherein the rotor disk includes a rotor disk support mounted around a sleeve projecting from the main support, the rotor disk support being axially-guided on the main support.

13. The annular disk brake as defined in claim 1, wherein the support comprises a plurality of axially-extending bolts to which a wheel of a vehicle can be connected.

14. The annular disk brake as defined in claim 1, wherein the actuator assembly comprises a pneumatic actuator.

15. The annular disk brake as defined in claim 14, wherein the pneumatic actuator has a substantially annular configuration, the pneumatic actuator being coaxially located with reference to the central axis.

16. The annular disk brake as defined in claim 1, wherein the casing comprises two axially-disposed parts removably connected together.

17. The annular disk brake as defined in claim 16, wherein the at least one first brake pads are two in number, one of the two parts of the casing being circumferentially-divided in two halves inside which are connected a respective one of the two first brake pads.

* * * * *